(12) United States Patent
Yanase (10) Patent No.: US 10,125,855 B2
(45) Date of Patent: Nov. 13, 2018

(54) TRANSMISSION DEVICE (71) Applicant: MUSASHI SEIMITSU INDUSTRY CO., LTD., Toyohashi-shi, Aichi (JP)

(72) Inventor: Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 389 days.

(21) Appl. No.: 15/079,193

(22) Filed: Mar. 24, 2016

(65) Prior Publication Data
US 2016/0290466 A1    Oct. 6, 2016

(30) Foreign Application Priority Data

Mar. 30, 2015 (JP) .................................. 2015-068190

(51) Int. Cl.
*F16H 48/40* (2012.01)
*F16H 48/38* (2012.01)

(52) U.S. Cl.
CPC ....... *F16H 48/40* (2013.01); *F16H 2048/385* (2013.01)

(58) Field of Classification Search
CPC ........................... F16H 48/40; F16H 2048/385
See application file for complete search history.

(56) References Cited

U.S. PATENT DOCUMENTS

| | | | | |
|---|---|---|---|---|
| 2,529,392 A | * | 11/1950 | Herreshoff | B60K 17/16 475/230 |
| 8,876,649 B2 | * | 11/2014 | Uchida | F16H 48/38 219/121.64 |
| 2001/0039228 A1 | * | 11/2001 | Eulenstein | F16H 48/08 475/230 |
| 2008/0229878 A1 | * | 9/2008 | Kohno | F16H 48/08 74/606 R |
| 2012/0295751 A1 | * | 11/2012 | Okada | F16H 57/0483 475/160 |
| 2015/0184734 A1 | | 7/2015 | Yanase | |
| 2015/0184735 A1 | | 7/2015 | Yanase | |

FOREIGN PATENT DOCUMENTS

| | | |
|---|---|---|
| JP | 47-000724 | 1/1972 |
| JP | 2011-167746 A | 9/2011 |
| JP | 2012-189116 A | 10/2012 |

(Continued)

*Primary Examiner* — David M Fenstermacher
(74) *Attorney, Agent, or Firm* — Carrier Blackman & Associates, P.C.; Joseph P. Carrier; William D. Blackman (57) ABSTRACT

In a transmission device, a flange portion includes: first outer peripheral portion fitted and welded to inner peripheral portion of ring gear; second outer peripheral portion small in diameter and adjacent to the first outer peripheral portion via first connecting surface; and third outer peripheral portion smaller in diameter and adjacent to the second outer peripheral portion on the opposite side from the first outer peripheral portion via second connecting surface. The ring gear includes space forming portion defining, between it and the flange portion, space faced by inner end of welded portion and extending radially inward and outward of the welded portion. Side surface of the stopper portion abuts against the second connecting surface, the stopper portion being formed in the ring gear and having inner peripheral surface press-fitted to the third outer peripheral portion.

8 Claims, 4 Drawing Sheets

(56) References Cited

FOREIGN PATENT DOCUMENTS

| | | |
|---|---|---|
| JP | 2013-181626 A | 9/2013 |
| JP | 5526567 B2 | 6/2014 |
| JP | 5614054 B2 | 10/2014 |
| WO | 2011/089704 A1 | 7/2011 |
| WO | 2012/039014 A1 | 3/2012 |

\* cited by examiner

TRANSMISSION DEVICE

BACKGROUND OF THE INVENTION

Field of the Invention

The present invention relates to a transmission device, particularly a differential device and other transmission devices which include in a transmission passage: a transmission member being rotatable and integrally including a flange portion in an outer peripheral portion thereof; and a ring gear welded to the flange portion of the transmission member and including a helical gear portion formed in an outer peripheral portion of the ring gear.

Description of the Related Art

Conventionally, as such a transmission device, for example, a differential device has been known which includes a differential case as a transmission member being rotatable and integrally having a flange portion in an outer peripheral portion thereof, and a ring gear press-fitted in a part to the flange portion of the differential case and welded in another part to the flange portion of the differential case, the differential device distributively transmitting power to a pair of left and right output shafts via a differential mechanism inside the differential case, the power having been transmitted from a drive source to the ring gear and further to the differential case (see Japanese Patent No. 5614054 and Japanese Patent Application KOKAI Publication No. 2012-189116, for example). In this differential device, a space is formed between the differential case and the ring gear for the purpose of alleviating stress concentration during press-fitting and also degassing a gas during welding is performed.

Meanwhile, in the conventional device, surfaces of the flange portion of the differential case and the ring gear which face each other in an axial direction are butt-welded together. Therefore, particularly in a case where a gear portion on an outer periphery of the ring gear is formed of a helical gear, a large thrust load occurs in a meshing portion of the helical gear, and applies large stress to a welded portion between the differential case and the ring gear. This large stress may affect durability of the welded portion.

Therefore, as a countermeasure against the stress concentration, it may be considered, for example, that the flange portion and the like around the welded portion is formed particularly thick or that a welding depth of the welded portion is increased. This case, however, causes different problems such as increase in the weight and cost of the device.

Incidentally, there are some other conventional devices in which surfaces of the flange portion of the differential case and the ring gear facing each other in a radial direction are butt-welded together, but no specific consideration has been given in order to alleviate the large stress which acts on the welded portion due to the large thrust load.

SUMMARY OF THE INVENTION

The present invention has been made with the foregoing situation taken into consideration. An object of the present invention is to provide a transmission device capable of solving the above-mentioned problem.

In order to achieve the object, a transmission device according to the present invention, comprises in a transmission passage a transmission member being rotatable, and the transmission member integrally including a flange portion in an outer peripheral portion of the transmission member; and a ring gear welded to the flange portion of the transmission member and including a helical gear portion formed in an outer peripheral portion of the ring gear, wherein in an outer peripheral surface of the flange portion, a first outer peripheral portion, a second outer peripheral portion and a third outer peripheral portion are formed, the first outer peripheral portion being fitted and welded to an inner peripheral portion of the ring gear, the second outer peripheral portion being smaller in diameter than the first outer peripheral portion and formed adjacent to the first outer peripheral portion with a first connecting surface interposed between the first outer peripheral portion and the second outer peripheral portion, and the third outer peripheral portion being smaller in diameter than the second outer peripheral portion and formed adjacent to the second outer peripheral portion on the opposite side from the first outer peripheral portion with a second connecting surface interposed between the third outer peripheral portion and the second outer peripheral portion, in the ring gear, a space forming portion is formed at least between the first outer peripheral portion and the third outer peripheral portion in an axial direction of the ring gear, the space forming portion defining a space between the space forming portion and the flange portion, the space being faced by an inner end of a welded portion between the first outer peripheral portion and the ring gear, the space is formed extending inward and outward of the inner end of the welded portion in a radial direction such that stress acting on a boundary corner portion between the first connecting surface and the second outer peripheral portion and a vicinity of the boundary corner portion is larger than stress acting on the inner end of the welded portion and a vicinity of the inner end when a thrust load occurs in the helical gear portion, and a side surface of a stopper portion abuts against the second connecting surface, the stopper portion being formed in the ring gear and having an inner peripheral surface press-fitted to the third outer peripheral portion. (This is a first characteristic of the present invention.)

According to the first characteristic, in the outer peripheral surface of the flange portion of the transmission member, the first outer peripheral portion, the second outer peripheral portion and the third outer peripheral portion are formed, the first outer peripheral portion being fitted and welded to the inner peripheral portion of the ring gear having the helical gear portion in the outer periphery, the second outer peripheral portion being small in diameter and formed adjacent to the first outer peripheral portion with the first connecting surface interposed between the first outer peripheral portion and the second outer peripheral portion, and the third outer peripheral portion being much smaller in diameter and formed adjacent to the second outer peripheral portion on the opposite side from the first outer peripheral portion with the second connecting surface interposed between the third outer peripheral portion and the second outer peripheral portion. The space forming portion is formed in the ring gear, the space forming portion defining the space between the spate forming portion and the flange portion, the space being faced by the inner end of the welded portion between the first outer peripheral portion and the ring gear. The space is formed extending inward and outward of the inner end of the welded portion in the radial direction such that the stress acting on the boundary corner portion between the first connecting surface and the second outer peripheral portion and the vicinity of the boundary corner portion is larger than the stress acting on the inner end of the welded portion and the vicinity of the inner end when the thrust load occurs in the helical gear portion. Thus, even if the large thrust load occurs in a meshing portion of the helical gear and acts on the ring gear, the specifically-provided space extending inward and outward of the inner end of the welded portion in the radial direction is capable of effectively distributing the stress to a peripheral portion of the welded portion and thereby alleviating stress concentration on the welded portion. Moreover, the side surface of the stopper portion abuts against the second connecting surface between the second and third outer peripheral portions, the stopper portion being formed in the ring gear and having the inner peripheral surface press-fitted to the third outer peripheral portion. Therefore, part of the thrust load is received on the flange portion side also via the abutment portion. Thus, the stress caused by the thrust load can be distributed further, and the stress concentration on the welded portion can be alleviated more effectively. As a result of these, as a countermeasure against the stress concentration, it is not necessary to thicken the peripheral portion of the welded portion or to particularly increase the welding depth of the welded portion. This can greatly contribute to reduction in the weight and cost of the device. Furthermore, the stopper portion performs both of: the stopper function of regulating the press-fitting depth when the stopper portion is press-fitted to the third outer peripheral portion; and the function of distributing the stress when the thrust load occurs. Thus, correspondingly, it is possible to simplify the structure of the device and contribute to further cost reduction.

In the transmission device according to the present invention, preferably, the first connecting surface is out of contact with the ring gear. (This is a second characteristic of the present invention.)

According to the second characteristic, the first connecting surface between the first and second outer peripheral portions is out of contact with the ring gear. Thus, the thrust load inputted into the flange portion side from the ring gear can be efficiently received by the abutment portion of the first connecting surface which abuts against the stopper portion. Thereby, the stress concentration on the welded portion can be alleviated more effectively.

In the transmission device according to the present invention, preferably, a surface of the ring gear facing the space and the side surface of the stopper portion abutting against the second connecting surface are connected to each other. (This is a third characteristic of the present invention.)

According to the third characteristic, the surface of the ring gear facing the space and the side surface of the stopper portion abutting against the second connecting surface are connected to each other. Since the two functionally-different surfaces are formed as a continuous surface, the structure of the inner peripheral portion of the ring gear can be accordingly simplified, and thus can be easily processed. Thereby, processing workability of the structure increases.

In the transmission device according to the present invention, preferably, a second space is formed between a corner portion and a portion of the stopper portion facing the corner portion, the corner portion being formed in a boundary portion between the second connecting surface and the third outer peripheral portion. (This is a fourth characteristic of the present invention.)

According to the fourth characteristic, the second space is formed between the corner portion and the portion of the stopper portion facing the corner portion, the corner portion being formed in the boundary portion between the second connecting surface and the third outer peripheral portion. Thus, it is possible to effectively inhibit the corner portion from being deformed as a result of the occurrence of the stress concentration on the corner portion due to the press-fitting of the stopper portion to the third outer peripheral portion, and to enhance the durability of the corner portion and its vicinity.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Embodiments of the present invention will be hereinbelow described based on the attached drawings.

Figure 1:
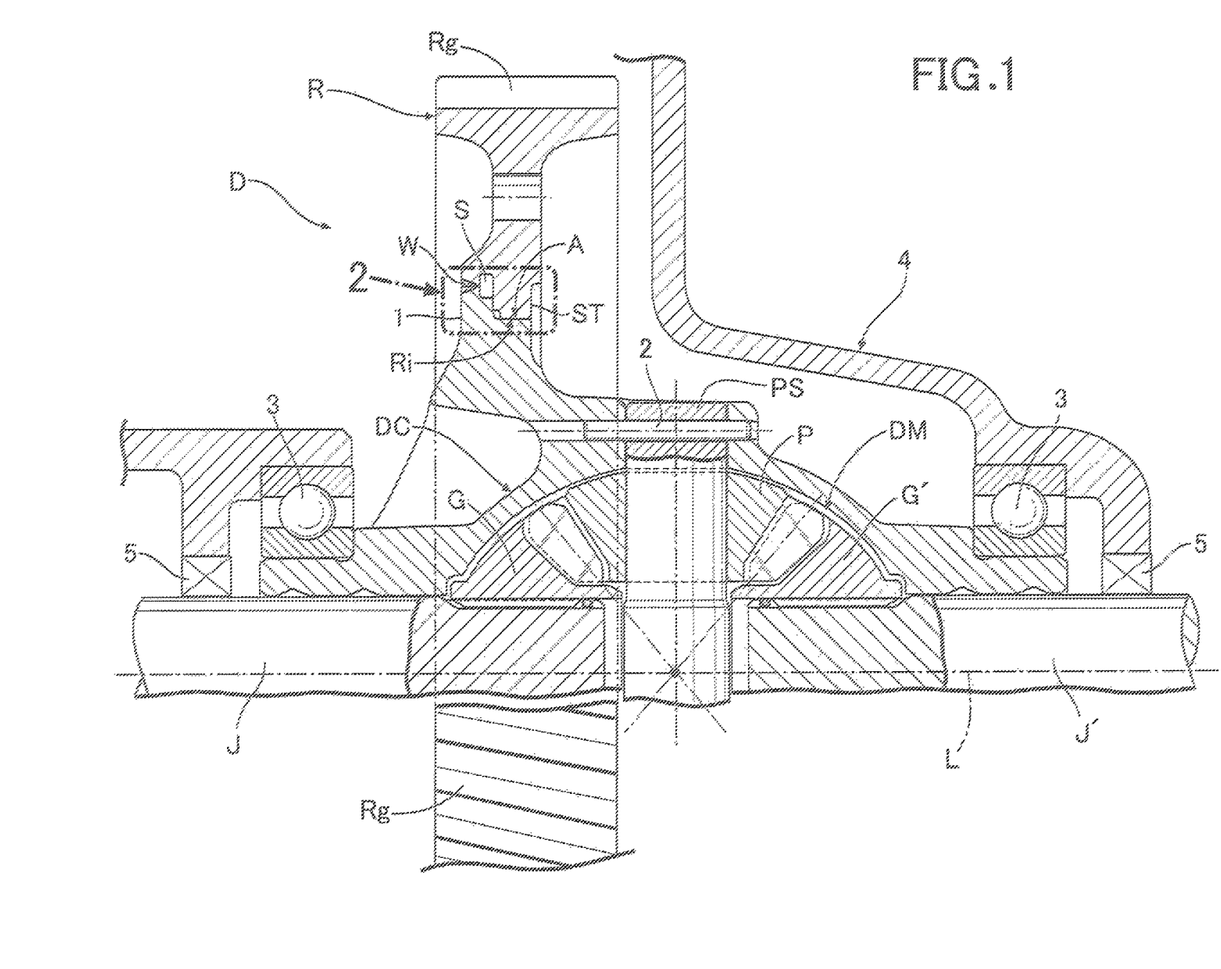
FIG. 1 is a sectional view of a main part of a differential device according to an embodiment of the present invention.

To begin with, in FIG. 1, a differential device D as a transmission device drives a pair of left and right axles while allowing differential rotation between the left and right axles by distributively transmitting rotational driving force to a pair of left and right output shafts J, J', the rotational driving force being outputted from an engine not illustrated which is installed in an automobile, and the left and right output shafts J, J' being continuous to the left and right axles. The differential device D is housed and supported in a transmission case 4 disposed beside the engine in a front portion of a vehicle body, for example.

The differential device D includes in a transmission passage, for example: a ring gear R as a final driven gear; a differential case DC as a transmission member integrally including a flange portion 1 in an outer peripheral portion, the flange portion 1 being joined to an inner peripheral portion Ri of the ring gear R; and a differential mechanism DM housed in the differential case DC and distributively transmitting the rotational force to the pair of left and right output shafts J, J', the rotational force having been transmitted from the ring gear R to the differential case DC. Both press-fitting and welding are used as joining means for joining the inner peripheral portion Ri of the ring gear R and the flange portion 1 of the differential case DC to each other, as described later.

The ring gear R integrally includes a helical gear portion Rg in an outer peripheral portion thereof. The helical gear portion Rg meshes with a drive gear (not illustrated) so as to receive the rotational driving force and straightly transmits the received rotational driving force to the differential case DC side, the drive gear being similarly formed from a helical gear and rotationally driven by power of the engine.

Like a conventional well-known differential mechanism, the differential mechanism DM inside the differential case DC includes a plurality of pinions P; a pinion shaft PS as a pinion support portion rotatably supporting the pinions P; and a pair of left and right side gears G, G' meshing with the pinions P from both left and right sides and spline-fitted respectively to the pair of left and right output shafts J, J'. An outer end portion of the pinion shaft PS is fitted and supported in the differential case DC. Joining means for integrally joining the pinion shaft PS and the differential case DC to each other (in an illustrated example, a retaining pin 2 penetrating through the pinion shaft PS and press-fitted to the differential case DC) is provided between the pinion shaft PS and the differential case DC.

The differential case DC is rotatably supported by the transmission case 4 via left and right bearings 3. In addition, seal members 5 each having an annular shape are installed between inner peripheries of through-holes formed in the transmission case 4 and outer peripheries of the output shafts J, J', respectively, the output shafts J, J' being inserted through the through-holes, and the seal members 5 respectively sealing interstices between the inner peripheries of the through-holes and the outer peripheries of the output shafts J, J' and thereby preventing from leaking lubricant oil from the inside to outside of the transmission case 4.

Figure 2:
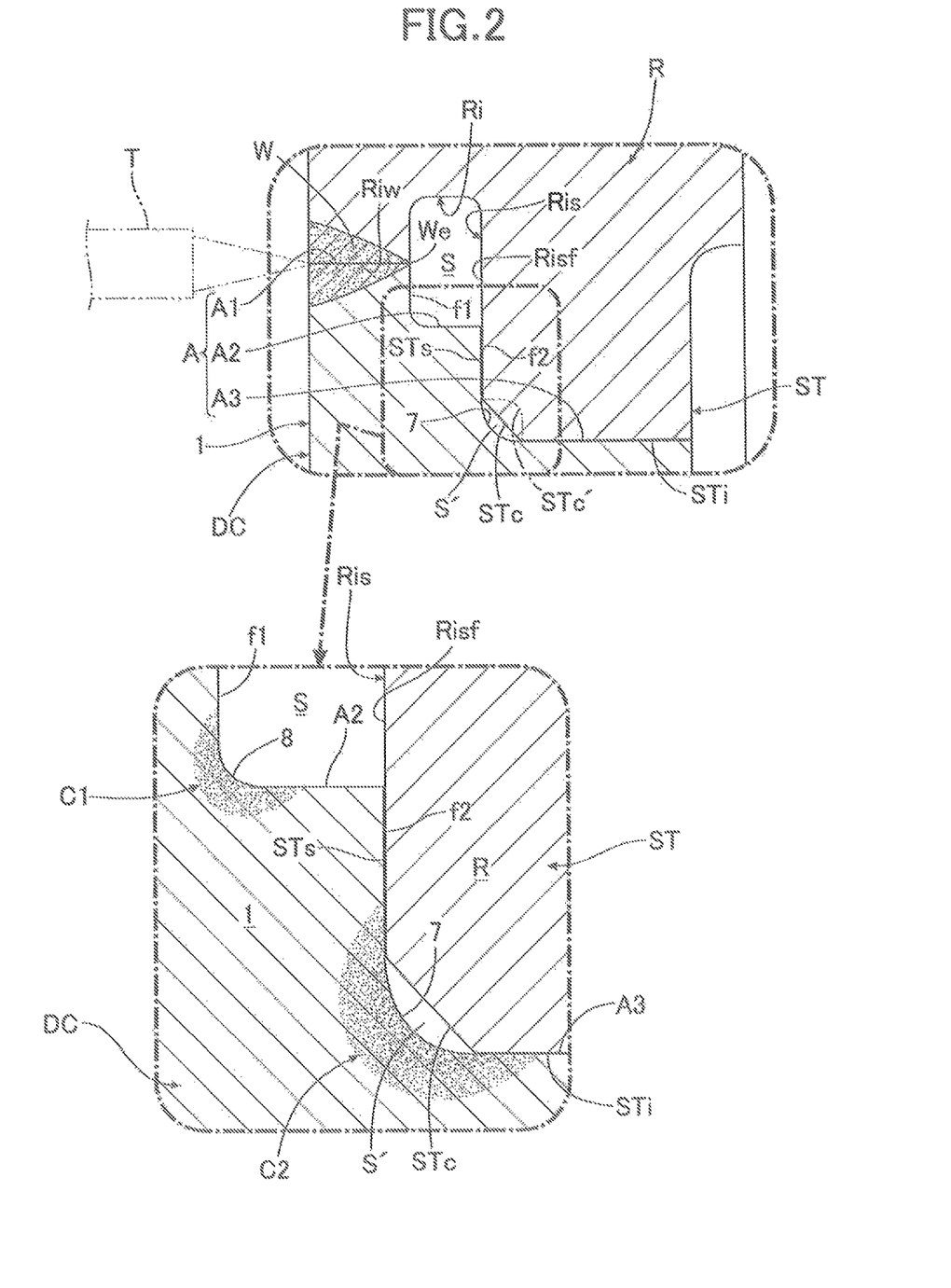
FIG. 2 is an enlarged sectional view showing welded and press-fitted portions between a ring gear and a differential case (an enlarged sectional view of a section indicated with an arrow 2 in FIG. 1).

Next, referring to FIG. 2 together, descriptions will be provided for a joining structure between the inner peripheral portion Ri of the ring gear R and the flange portion 1 of the differential case DC.

In an outer peripheral surface A of the flange portion 1, a first outer peripheral portion A1, a second outer peripheral portion A2 and a third outer peripheral portion A3 are formed, the first outer peripheral portion A1 being fitted and welded to a welding portion Riw formed in the inner peripheral portion Ri of the ring gear R, the second outer peripheral portion A2 being formed adjacent to the first outer peripheral portion A1 and smaller in diameter than the first outer peripheral portion A1, and the third outer peripheral portion A3 being formed adjacent to the second outer peripheral portion A2 on the opposite side from the first outer peripheral portion A1 and smaller in diameter than the second outer peripheral portion A2. Thereby, in the outer peripheral surface A of the flange portion 1, there are formed: a step surface between the first and second outer peripheral portions A1, A2, that is, a first connecting surface f1 connecting the first and second outer peripheral portions A1, A2 to each other; and a step surface between the second and third outer peripheral portions A2, A3, that is, a second connecting surface f2 connecting the second and third outer peripheral portions A2, A3 to each other.

In the inner peripheral portion Ri of the ring gear R, a space forming portion Ris is formed at least between the first outer peripheral portion A1 and the third outer peripheral portions A3 in an axial direction of the ring gear R, the space forming portion Ris having an annular groove shape and defining a space S between the space forming portion Ris and the flange portion 1 (in the illustrated example, between the space forming portion Ris, and the second outer peripheral portion A2 and the first connecting surface f1), the space S having an annular shape, being faced by an inner end We of a welded portion W between the first outer peripheral portion A1 and the ring gear R, and extending inward and outward of the welded portion W in the radial direction. In addition, the space S is formed extending long inward and outward of the inner end We of the welded portion W in the radial direction such that when the thrust load occurs in the helical gear portion Rg, stress acting on a boundary corner portion 8 between the first connecting surface f1 and the second outer peripheral portion A2 and the vicinity of the boundary corner portion 8 is larger than stress acting on the inner end We of the welded portion W and the vicinity of the inner end We. Thereby, the first connecting surface f1 and the second outer peripheral portion A2 face the space S and are out of contact with the ring gear R, the first connecting surface f1 connecting the first and second outer peripheral portions A1, A2.

A stopper portion ST having an annular shape is projected from the inner peripheral portion Ri of the ring gear R and continuous to the space forming portion Ris, and a side surface STs of the stopper portion ST abuts against the second connecting surface f2 so as to be in a surface contact state, the second connecting surface f2 connecting the second and third outer peripheral portions A2, A3. Furthermore, an inner peripheral surface STi of the stopper portion ST is press-fitted into the third outer peripheral portion A3. Locating and fixing of the ring gear R with respect to the flange portion 1 of the differential case DC in the axial and radial directions are achieved by this press-fitting.

In addition, a surface of the ring gear R facing the space S, that is, a surface of the space forming portion Ris (particularly, an inner side surface Risf which is farther from the welded portion W in the axial direction) and the side surface STs of the stopper portion ST abutting against the second connecting surface f2 are connected smoothly to each other. In the illustrated example, the inner side surface Risf and the side surface STs form a single flat surface. Since the two of the inner side surface Risf and the side surface STs having different functions (that is, respectively having a space forming function and a thrust load receiving function) are formed as a smooth continuous surface as described above, the structure of the inner peripheral portion Ri of the ring gear R can be simplified, and thus can be easily processed. Thereby, processing workability of the structure increases.

A corner portion 7 is formed in a boundary portion between the second connecting surface f2 and the third outer peripheral portion A3, the corner portion 7 being rounded such that a cross section thereof has an arc shape. The roundness facilitates stress distribution in the corner portion 7 and its vicinity. Meanwhile, a portion STc of the stopper portion ST which faces the corner portion 7 is formed as an approximately flat chamfered surface. In this way, a space S' having an annular shape is formed between the chamfered surface STc and the corner portion 7 facing the chamfered surface STc and having the cross section with the arc shape.

It should be noted that the portion STc of the stopper portion ST facing the corner portion 7 may be formed as a rounded surface STc' instead of being formed as the chamfered surface STc having an approximately flat shape as described above, the rounded surface STc' having a cross section with an arc shape and being concaved and curved in a direction separating from the corner portion 7 as indicated with a chain line in FIG. 2. Furthermore, in this case, the corner portion 7 may be formed as an approximately flat chamfered surface.

Next, descriptions will be provided for an operation of the embodiment. The differential device D of the embodiment is configured to operate as follows when the ring gear R receives the rotational force from the engine. In a case where the pinion P revolves around an axis L of the differential case DC together with the differential case DC without rotating around the pinion shaft PS, the left and right side gears G, G' are rotationally driven at the same speed, and driving force of the left and right side gears G, G' is equally transmitted to the left and right output shafts J, J'. In addition, in a case where difference in rotational speed occurs between the left and right output shafts J, J' due to turn traveling or the like of the automobile, the pinion P revolves around the axis L of the differential case DC while rotating around the pinion shaft PS. Thereby, the rotational driving force is transmitted from the pinion P to the left and right side gears G, G' while allowing differential rotations. The above-described operation is the same as that of the conventional well-known differential device.

Meanwhile, in the embodiment, the inner peripheral portion Ri of the ring gear R is attached and fixed to the flange portion 1 having an annular shape and integral with an outer periphery of the differential case DC by both press-fitting and welding.

In the attaching and fixing work, firstly, the welding portion Riw of the inner peripheral portion Ri of the ring gear R is lightly press-fitted to the first outer peripheral portion A1 of the flange portion 1 with relatively small press-fitting load, and an inner peripheral surface STi of the stopper portion ST is fully press-fitted to the third outer peripheral portion A3 of the flange portion 1 with relatively large press-fitting load. Incidentally, to achieve this press-fitting mode, a dimensional difference between an outer diameter of the first outer peripheral portion A1 and an inner diameter of the welding portion Riw and a dimensional difference between an outer diameter of the third outer peripheral portion A3 and an inner diameter of the stopper portion ST are differently set depending on the necessity before the press-fitting process.

After the press-fitting work, the fitted portion by light press-fitting between the first outer peripheral portion A1 of the flange portion 1 and the welding portion Riw of the inner peripheral portion Ri of the ring gear R are butt-welded together from an outside of the fitted portion.

The welding work is performed, for example, by: as indicated with chain lines in FIG. 2, irradiating an outer end of the abutment portion where the first outer peripheral portion A1 and the welding portion Riw are abutted against each other, with a laser beam from a welding laser torch T disposed on the outside of the flange portion 1 and the ring gear R; and slowly rotating the press-fitted combination body of the differential case DC and the ring gear R around the axis L of the rotation of the combination body. Energy of the laser beam makes it possible to butt-weld the first outer peripheral portion A1 of the flange portion 1 and the welding portion Riw of the inner peripheral portion Ri of the ring gear R to each other around their full peripheries. Incidentally, the welded portion W may be provided to only a part between them in a peripheral direction.

Thus, in the embodiment, the outer peripheral surface A of the flange portion 1 of the differential case DC as the transmission member includes: the first outer peripheral portion A1 fitted and welded to the welding portion Riw of the inner peripheral portion Ri of the ring gear R; the second outer peripheral portion A2 being small in diameter and formed adjacent to the first outer peripheral portion A1; and the third outer peripheral portion A3 being much smaller in diameter and formed adjacent to the second outer peripheral portion A2 on the opposite side from the first outer peripheral portion A1. The space forming portion Ris is formed in the inner peripheral portion Ri of the ring gear R, the space forming portion Ris defining the space S between the space forming portion Ris and the flange portion 1, the space S having the annular shape and being faced by the inner end We of the welded portion W between the first outer peripheral portion A1 and the welding portion Riw. Furthermore, the space S having the annular shape is formed extending long inward and outward of the inner end We of the welded portion W in the radial direction such that stress acting on the boundary corner portion 8 between the first connecting surface f1 and the second outer peripheral portion A2 and the vicinity of the boundary corner portion 8 is larger than stress acting on the inner end We of the welded portion W and the vicinity of the inner end We when the thrust load occurs in the helical gear portion Rg. For these reasons, even if the large thrust load occurs in a meshing portion of the helical gear Rg and thus acts on the ring gear R (accordingly to the welded portion W) while the power is being transmitted from the engine to the differential gear DC, the specifically-provided space S is capable of effectively distributing the stress to a peripheral portion of the welded portion W and thereby alleviating stress concentration on the welded portion W.

Moreover, the side surface STs of the stopper portion ST abuts against the second connecting surface f2 between the second and third outer peripheral portions A2, A3, the stopper portion ST being formed in the ring gear R and having the inner peripheral surface STi press-fitted to the third outer peripheral portion A3. Thus, part of the thrust load is received on the flange portion 1 side also via the abutment portion. Therefore, the stress caused by the thrust load can be further distributed, and the stress concentration on the welded portion W can be alleviated more effectively. As a result of these, as a countermeasure against the stress concentration, it is not necessary to particularly thicken the peripheral portion of the welded portion W or to particularly increase the welding depth of the welded portion W. Accordingly, it is advantageous for reducing the weight and cost of the device.

Next, referring to a partial-enlarged view in FIG. 2 together, complementary descriptions will be provided for the stress distribution effect which has been described above. For example, in a case where the ring gear R receives the large thrust load acting leftward in FIG. 2 on the flange portion 1 of the differential case DC while transmitting the power, a first stress concentration portion C1 occurs in the boundary corner portion 8 between the second outer peripheral portion A2 and the first connecting surface f1 and the vicinity of the boundary corner portion 8, and a second stress concentration portion C2 occurs in the corner portion 7 between the third outer peripheral portion A3 and the second connecting surface f2 and the vicinity of the corner portion 7, as schematically shown in the partial-enlarged view in FIG. 2. In this respect, the first stress concentration portion C1 and the second stress concentration portion C2 are respectively located in positions separating from the welded portion W, and larger stress occurs in the second stress concentration portion C2 than in the first stress concentration portion C1. The stress concentration portions C1, C2 caused by the thrust load are not concentrated only in the welded portion W and its vicinity and distributed to the portions separating from the welded portion W. Thereby, it is possible to effectively inhibit the occurrence of the large stress concentration in the inner end We of the welded portion W and its vicinity.

Moreover, the above-described stopper portion ST performs both of: the stopper function of regulating the press-fitting depth when the stopper portion ST is press-fitted to the third outer peripheral portion A3; and the function of distributing the stress when the thrust load occurs. This contributes to simplification of the structure of the device.

Besides, the first connecting surface f1 connecting the first and second outer peripheral portions A1, A2 is out of contact with the ring gear R. For this reason, the thrust load inputted into the flange portion 1 side from the ring gear R can be efficiently received by the abutment portion of the second connecting surface f2 between the second and third outer peripheral portions A2, A3 which abuts against the stopper portion ST. Thereby, the stress concentration on the welded portion W can be alleviated more effectively.

In addition, in the embodiment, the second space S' is formed between the corner portion 7 and the portion STc (or STc') of the stopper portion ST facing the corner portion 7, the corner portion 7 being formed in the boundary portion between the second connecting surface f2 and the third outer peripheral portion A3. For this reason, it is possible to effectively inhibit the corner portion 7 and its vicinity from being deformed as the result of the occurrence of the stress concentration on the corner portion 7 and its vicinity due to the press-fitting of the stopper portion ST to the third outer peripheral portion A3.

The foregoing embodiment has shown the example where the space S is formed in an approximately rectangular shape which is longitudinally long in the radial direction as seen in the cross-sectional view, the space S having the annular shape and being defined by the space forming portion Ris in the inner periphery of the ring gear R and the outer periphery (particularly, the first connecting surface f1 and the second outer peripheral portion A2) of the flange portion 1. However, the cross-sectional shape and defining mode of the space S may be selected from various embodiments which will be exemplified below.

Figure 3A:
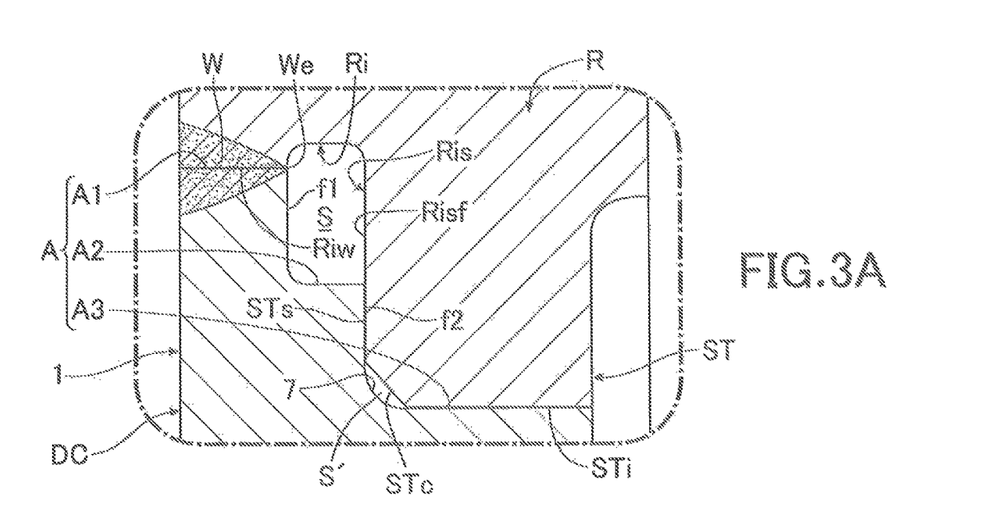
FIGS. 3A and 3B are sectional views corresponding to FIG. 2 and showing welded and press-fitted portions between ring gears and differential cases of other embodiments.

For example, in an embodiment exemplified in FIG. 3A, the space S having the annular shape is offset inward of the welded portion W in the radial direction.

Figure 3B:
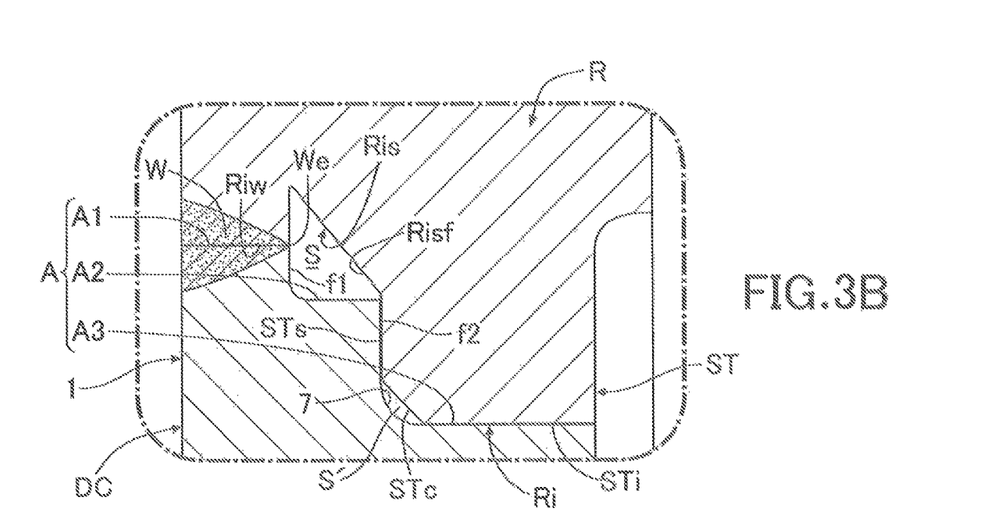
Figure 4A:
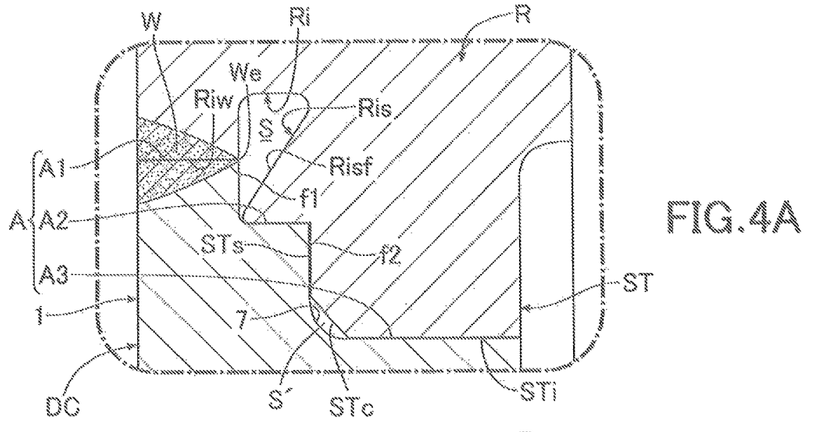
FIGS. 4A to 4C are sectional views corresponding to FIG. 2 and showing welded and press-fitted portions between ring gears and differential cases of still other embodiments.

Furthermore, in embodiments exemplified respectively in FIGS. 3B and 4A, the space S having the annular shape is formed such that the cross section of the space S has a triangle shape.

Figure 4B:
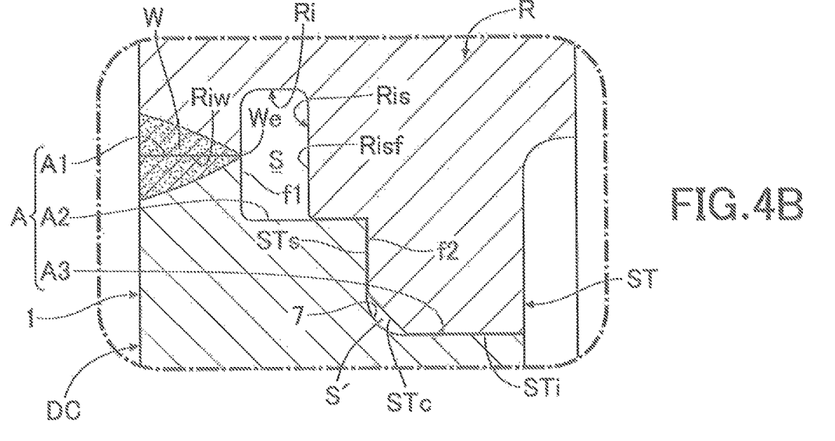

Moreover, in an embodiment exemplified in FIG. 4B, the groove width of the space forming portion Ris for defining the space S having the annular shape is set shorter than the width of the second outer peripheral portion A2 in the axial direction, and a step is formed between the inner side surface Risf of the space forming portion Ris and the side surface STs of the stopper portion ST.

Figure 4C:
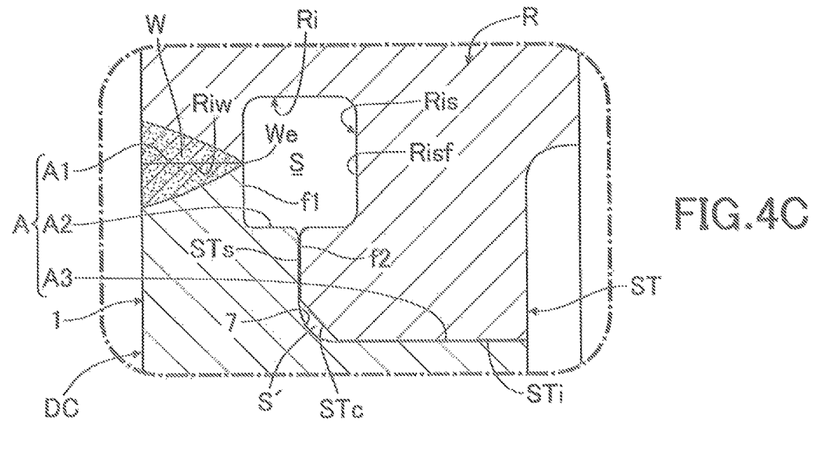

Besides, in an embodiment exemplified in FIG. 4C, the groove width of the space forming portion Ris for defining the space S having the annular shape is set longer than the width of the second outer peripheral portion A2 in the axial direction. Thereby, a step directed in a direction opposite to the step in the embodiment shown in FIG. 4B is formed between the inner side surface Risf of the space forming portion Ris and the side surface STs of the stopper portion ST.

Although the embodiments of the present invention have been described, the present invention is not limited to the embodiments. Various design changes can be made to the present invention within the scope not departing from the gist of the present invention.

For example, although the foregoing embodiments have shown the example of the differential device D as the transmission device which is installed in the automobile, the present invention is applicable to differential devices used in transmission systems of various machines other than the automobile. Furthermore, the present invention is also applicable to various transmission devices (transmission devices each including at least in a transmission passage: a transmission member being rotatable and integrally including at least a flange portion in an outer peripheral portion thereof; and a ring gear welded to the flange portion of the transmission member and including a helical gear portion formed in an outer peripheral portion of the ring gear) other than the differential device.

Moreover, although in the foregoing embodiments, the differential device D as the transmission device allows rotational difference between left and right axles, the present invention is also applicable to a center differential which absorbs rotational difference between front and rear wheels.

What is claimed is:

1. A transmission device comprising in a transmission passage:
a transmission member being rotatable, and the transmission member integrally including a flange portion in an outer peripheral portion of the transmission member; and
a ring gear welded to the flange portion of the transmission member and including a helical gear portion formed in an outer peripheral portion of the ring gear, wherein
in an outer peripheral surface of the flange portion, a first outer peripheral portion, a second outer peripheral portion and a third outer peripheral portion are formed, the first outer peripheral portion being fitted and welded to an inner peripheral portion of the ring gear, the second outer peripheral portion being smaller in diameter than the first outer peripheral portion and formed adjacent to the first outer peripheral portion with a first connecting surface interposed between the first outer peripheral portion and the second outer peripheral portion, and the third outer peripheral portion being smaller in diameter than the second outer peripheral portion and formed adjacent to the second outer peripheral portion on the opposite side from the first outer peripheral portion with a second connecting surface interposed between the third outer peripheral portion and the second outer peripheral portion,
in the ring gear, a space forming portion is formed at least between the first outer peripheral portion and the third outer peripheral portion in an axial direction of the ring gear, the space forming portion defining a space between the space forming portion and the flange portion, the space being faced by an inner end of a welded portion between the first outer peripheral portion and the ring gear,
the space is formed extending inward and outward of the inner end of the welded portion in a radial direction such that stress acting on a boundary corner portion between the first connecting surface and the second outer peripheral portion and a vicinity of the boundary corner portion is larger than stress acting on the inner end of the welded portion and a vicinity of the inner end when a thrust load occurs in the helical gear portion, and
a side surface of a stopper portion abuts against the second connecting surface, the stopper portion being formed in the ring gear and having an inner peripheral surface press-fitted to the third outer peripheral portion.

2. The transmission device according to claim 1, wherein the first connecting surface is out of contact with the ring gear.

3. The transmission device according to claim 1, wherein a surface of the ring gear facing the space and the side surface of the stopper portion abutting against the second connecting surface are connected to each other.

4. The transmission device according to claim 2, wherein a surface of the ring gear facing the space and the side surface of the stopper portion abutting against the second connecting surface are connected to each other.

5. The transmission device according to claim 1, wherein a second space is formed between a corner portion and a portion of the stopper portion facing the corner portion, the corner portion being formed in a boundary portion between the second connecting surface and the third outer peripheral portion.

6. The transmission device according to claim 2, wherein a second space is formed between a corner portion and a portion of the stopper portion facing the corner portion, the corner portion being formed in a boundary portion between the second connecting surface and the third outer peripheral portion.

7. The transmission device according to claim 3, wherein a second space is formed between a corner portion and a portion of the stopper portion facing the corner portion, the corner portion being formed in a boundary portion between the second connecting surface and the third outer peripheral portion.

8. The transmission device according to claim 4, wherein a second space is formed between a corner portion and a portion of the stopper portion facing the corner portion, the corner portion being formed in a boundary portion between the second connecting surface and the third outer peripheral portion.

\* \* \* \* \*